United States Patent [19]

Bedgood et al.

[11] 4,105,285

[45] Aug. 8, 1978

[54] SINGLE OPTICAL FIBER CONNECTOR

[75] Inventors: Michael Albert Bedgood, Harlow; John Stuart Leach, Stortford, both of England

[73] Assignee: International Standard Electric Corporation, New York, N.Y.

[21] Appl. No.: 776,597

[22] Filed: Mar. 11, 1977

[30] Foreign Application Priority Data

Mar. 16, 1976 [GB] United Kingdom ............... 10461/76

[51] Int. Cl.² .............................................. G02B 5/14
[52] U.S. Cl. .................................................. 350/96.21
[58] Field of Search ........................... 350/96 C, 96.21

[56] References Cited

U.S. PATENT DOCUMENTS

| 3,880,452 | 4/1975 | Fields | 350/96 C |
| 3,948,582 | 4/1976 | Martin | 350/96 C |
| 4,015,894 | 4/1977 | Rocton | 350/96 C |
| 4,026,633 | 5/1977 | Crick | 350/96 C |

*Primary Examiner*—John K. Corbin
*Assistant Examiner*—Stewart Levy
*Attorney, Agent, or Firm*—Thomas L. Peterson

[57] ABSTRACT

A single optical fiber connector in which a watch X-jewel is employed to align the two fibers to be coupled.

1 Claim, 3 Drawing Figures

SINGLE OPTICAL FIBER CONNECTOR

BACKGROUND OF THE INVENTION

This invention relates generally to optical fiber connectors and, in particular, to a demountable connector assembly having means for accurately aligning a pair of single optical fibers.

Single optical fiber connectors generally comprise a pair of very accurately machined ferrule members which are aligned via some form of alignment arrangement. While such arrangements are satisfactory in operation, the close tolerance machining required makes them relatively expensive to manufacture. Furthermore, the sophisticated alignment methods involved require the attention of skilled technicians for both installation and servicing.

Copending application of Phillips et al. entitled "Termination of Optical Fibers", Ser. No. 679,759, filed Apr. 23, 1976, assigned to the assignee of the present application, discloses a single fiber termination which utilizes a watch pierced bearing jewel for centering an unsheathed fiber end in a ferrule. The use of a watch jewel, which is readily available, decreases manufacturing costs yet allows accurate alignment of fibers mounted in a pair of terminations employing such jewels.

U.S. Pat. No. 3,902,785 discloses an optical fiber connector which uses short glass capillary tubes for aligning a pair of single optical fibers. The connector has a number of disadvantages, including the fact that the capillary tubes are fragile and the connector uses a number of movable parts.

The purpose of the present invention is to provide another form of single fiber connector which is relatively inexpensive to manufacture, is simple in construction, and does not require a high degree of skill to assemble and service.

SUMMARY OF THE INVENTION

According to one aspect of the present invention, there is provided an optical fiber connector arrangement for coupling a pair of single fibers, including a watch X-jewel whose bore corresponds to the diameter of the fibers, and means for mounting the fibers such that they will be optically coupled in the bore of the X-jewel.

According to another aspect of the invention, there is provided a female optical connector member including a tubular body having a X-jewel mounted therein. The bore of the X-jewel is in alignment with the axis of the tubular body. The tubular member is adapted to receive the unsheathed end of a single optical fiber such that the end of the fiber enters the bore of the X-jewel. The X-jewel bore provides alignment of the fiber end with a second fiber end when the connector member is mated with a corresponding male connector member.

According to a further aspect of the invention, there is provided an optical connector assembly including a first connector member secured to the unsheathed end of a first single optical fiber. An X-jewel mounted in the connector member has a bore therethrough into which the fiber end protrudes. A second connector member is secured to the unsheathed end of a second single optical fiber. The second connector member has an elastomeric nose portion supporting the second fiber end. When the connector members are mated, the elastomeric nose portion abuts the X-jewel and is deformed so as to expose the end of the second fiber thus allowing the end to enter the bore of the jewel and couple optically with the end of the first fiber.

DESCRIPTION OF THE PREFERRED EMBODIMENT

Figure 1A:
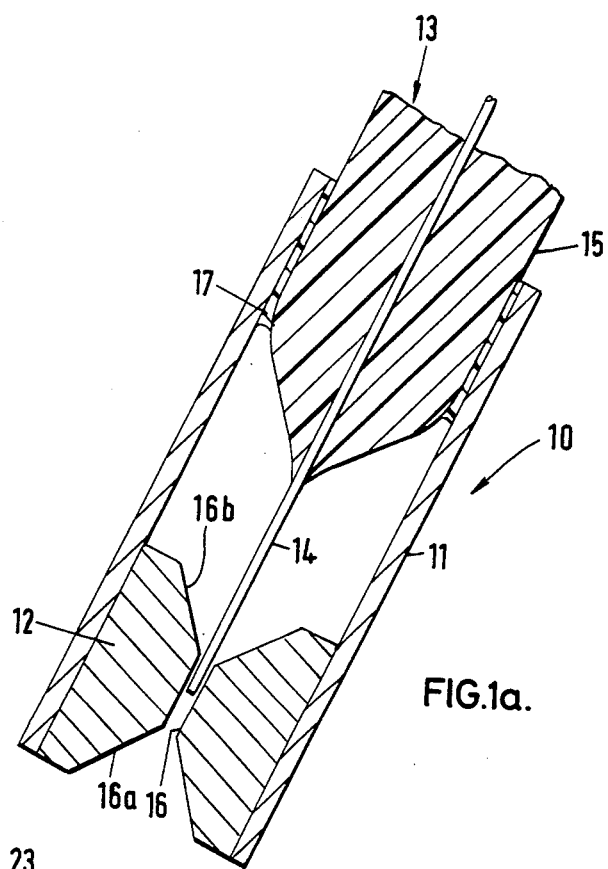
FIGS. 1a and 1b are longitudinal sectional views of the female and male connector members, respectively, of the connector assembly.

Referring to FIG. 1a of the drawings in detail, there is illustrated a female connector member 10 comprising a tubular body 11 having a watch X-jewel 12 mounted at one end and receiving the stripped or unsheathed end of a plastic sheathed optical fiber 13 at the other end. The sheathed fiber 13 is prepared with the end of its fiber 14 protruding from the sheath 15 such that, when the fiber is fitted into the connector member, the bare fiber end 14 is inserted approximately half way along the bore 16 in the X-jewel 12. The bore 16 joins two oppositely opening coaxial conical recesses 16a and 16b formed in the front and rear of the X-jewel. With the bare fiber 14 in its correct position, the plastic sheathed fiber 13 is secured to the tubular body 11 by a film 17 of adhesive.

Figure 1B:
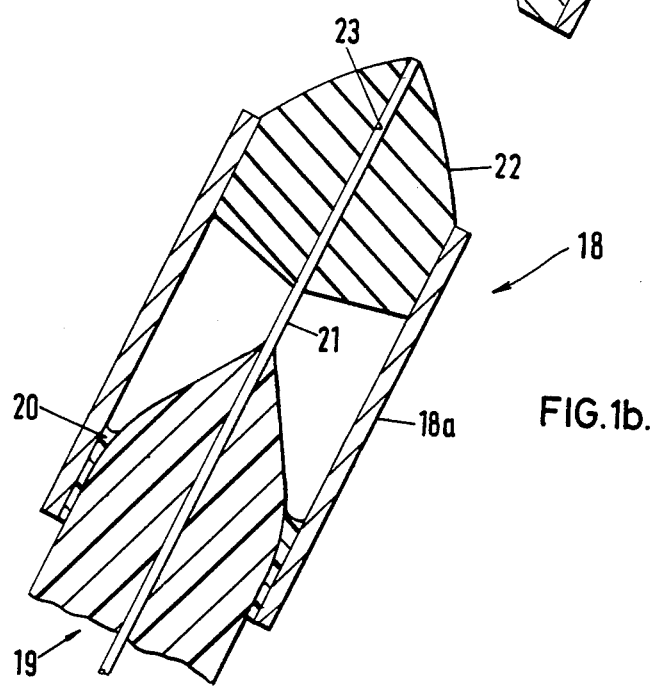

The corresponding male connector member 18 of FIG. 1b is of similar construction having a tubular body 18a to which the unsheathed end of a plastic sheathed fiber 19 is secured with a film 20 of adhesive. The bare fiber end 21 of the fiber 19 is supported in a resilient elastomeric, e.g. silicone rubber, insert 22 mounted in the tubular body 18a. The insert 22 is provided with a bore 23 of sufficient size to allow the fiber 21 to be slidably threaded therethrough.

Figure 2:
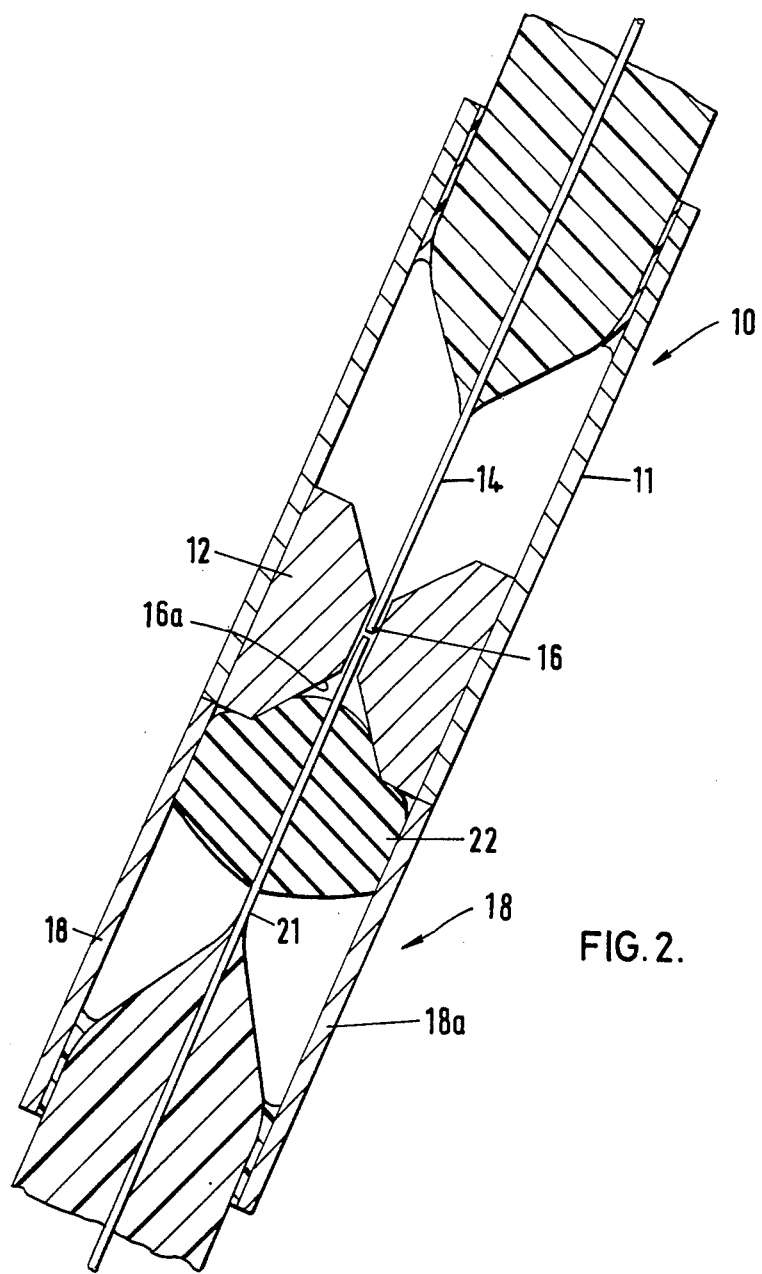
FIG. 2 shows the connector members of FIGS. 1a and 1b mated together.

FIG. 2 shows the connector members 10 and 18 of FIGS. 1a and 1b fully mated together. As the two connector bodies 11 and 18a are pushed together, the conical surface of the front recess 16a in the X-jewel 12 abuts the resilient insert 22 squashing it back into the tubular body 18a and exposing the end of the bare fiber 21. When the connector bodies are pushed fully together and into abutment, the exposed end of the bare fiber 21 enters the bore 16 of the X-jewel 12, as shown in FIG. 2, so as to couple optically to the fiber 14. When the connector bodies 11 and 18a are separated, the resilient insert 22 springs back to its original configuration as to protect the bare end of the fiber 21.

The tubular body members 11 and 18a may advantageously be provided with guide and latch means (not shown) to facilitate coupling of the body members and to releasably secure them together when mated. The double cone X-jewel arrangement employed ensures that the two fibers being coupled are accurately aligned in the bore of the jewel.

In further applications, several connector assemblies of the types shown in FIGS. 1a and 1b, and in FIG. 2 may be employed in the construction of a multi-channel single fiber connector.

The X-jewel technique may be employed in optical connectors other than those shown in FIGS. 1 and 2. The essential feature of the technique is that the two fibers to be coupled meet in and are accurately aligned by the X-jewel bore.

What is claimed is:

1. A single optical fiber connector comprising:

a first connector member;

a first single optical fiber secured in said first connector member and having an unsheathed end, a watch X-jewel fixedly mounted in said connector member having a pair of oppositely opening coaxial conical recesses therein joined by a small bore, said unsheathed fiber end extending partially into said bore;

a second connector member;

a second single optical fiber secured in said second connector member against axial movement therein and having unsheathed end;

said second connector member embodying an elastomeric nose portion having a front end and a bore therein slidably receiving said unsheathed end of said second fiber, said unsheathed end of said second fiber extending forwardly in said bore than said front end whereby said nose portion protects said fiber end; and when said connecter members are mated, said elastomeric nose portion abuts said X-jewel and is deformed axially so as to expose said unsheathed end of said second fiber thus allowing said end to enter said bore of said jewel and couple optically with said end of said first fiber.

* * * * *